(12) United States Patent
Troyer

(10) Patent No.: US 9,802,514 B2
(45) Date of Patent: Oct. 31, 2017

(54) SEAT FOR A LAW ENFORCEMENT VEHICLE AND METHOD OF USE

(71) Applicant: Bradley A. Troyer, Idaho Falls, ID (US)

(72) Inventor: Bradley A. Troyer, Idaho Falls, ID (US)

(*) Notice: Subject to any disclaimer, the term of this patent is extended or adjusted under 35 U.S.C. 154(b) by 0 days.

(21) Appl. No.: 15/376,273

(22) Filed: Dec. 12, 2016

(65) Prior Publication Data

US 2017/0088022 A1 Mar. 30, 2017

Related U.S. Application Data

(63) Continuation-in-part of application No. 14/798,205, filed on Jul. 13, 2015, now abandoned.

(51) Int. Cl.

| B60N 2/24 | (2006.01) |
|---|---|
| B60N 2/06 | (2006.01) |
| B60R 22/12 | (2006.01) |
| B60R 22/00 | (2006.01) |
| B60R 22/02 | (2006.01) |

(52) U.S. Cl.
CPC ............ *B60N 2/24* (2013.01); *B60N 2/062* (2013.01); *B60N 2/245* (2013.01); *B60R 22/001* (2013.01); *B60R 22/12* (2013.01); *B60R 2022/003* (2013.01); *B60R 2022/027* (2013.01)

(58) Field of Classification Search
CPC ............ A47D 15/006; B60R 2022/003; B60R 2022/027; B60N 2/24; B60N 2/245; B60N 2/062
See application file for complete search history.

(56) References Cited

U.S. PATENT DOCUMENTS

| 3,761,124 | A  | * | 9/1973 | Weik ................... | B60N 2/7029 297/112 |
|---|---|---|---|---|---|
| 2006/0061198 | A1 | * | 3/2006 | Squires ................ | A47C 7/62 297/466 |
| 2010/0117413 | A1 | * | 5/2010 | Squires ................ | A47C 7/62 297/217.1 |
| 2011/0210598 | A1 | * | 9/2011 | Kovac .................. | B60R 21/12 297/466 |
| 2012/0032466 | A1 | * | 2/2012 | Line .................... | B60N 2/062 296/65.12 |
| 2015/0069813 | A1 | * | 3/2015 | Furr ..................... | B60R 22/00 297/484 |
| 2016/0176318 | A1 | * | 6/2016 | Poulos ................. | B60N 2/12 297/235 |

* cited by examiner

*Primary Examiner* — James A English
(74) *Attorney, Agent, or Firm* — Schmeiser, Olsen & Watts LLP

(57) ABSTRACT

Disclosed is a method of use of a movable seat for a law enforcement vehicle. A method of restraining a detainee within a vehicle may include the steps of: opening a door on a vehicle comprising a movable seat; retracting the movable seat from a first position in the vehicle to a second position adjacent the door of the vehicle; seating a detainee in the movable seat of the vehicle; wherein the detainee's hands are restrained behind its back; positioning the detainee's hands in an opening in a back of the movable seat; restraining the detainee in the movable seat with a seat belt coupled to the movable seat; returning the movable seat to the first position inside the vehicle; and closing the door on the vehicle.

20 Claims, 11 Drawing Sheets

SEAT FOR A LAW ENFORCEMENT VEHICLE AND METHOD OF USE

CROSS REFERENCE TO RELATED APPLICATION[S]

This application is a continuation of U.S. patent application entitled "SEAT FOR A LAW ENFORCEMENT VEHICLE AND METHOD OF USE," Ser. No. 14/798,205, filed Jul. 13, 2015, now pending, the disclosure of which is hereby incorporated entirely herein by reference.

BACKGROUND OF THE INVENTION

Technical Field

This invention relates to a device and method of use for a seat for installation in a law enforcement or other vehicle. Specifically, the invention relates to a seat with a harness restraint and an opening in the seat back for a prisoner's hands. A movable seat is also disclosed, which is mounted on a track for moving into and out of a vehicle into which a prisoner or uncooperative person may be safely loaded and restrained for transport.

State of the Art

Transporting prisoners is potentially dangerous, both for law enforcement personnel and the prisoner. Individuals being transported by law enforcement officers may not uncommonly be under the influence of illegal drugs, including methamphetamine or phencyclidine which may cause uncontrollable violent behavior.

When a person is taken into custody, the person is typically handcuffed and placed in the back seat of a police car, van or the like. It can be awkward and dangerous to place a handcuffed person in the back of a police car. The detainee may thrash about, kick, or attempt to bite the arresting officer(s). Oftentimes, the handcuffed detainee is forced into the back seat of a police car or van.

Once in the car, the officer must attempt to place a seat belt around the prisoner. This can be dangerous for the officer, as they must reach across the prisoner in a confined space. Often, the prisoner will try to injure the officer, spit on them or the like. If the prisoner is fighting too much, the officer may have no choice but to not buckle the detainee into the vehicle. In these situations, the detainee is free to move about within the back seat of the police vehicle and may injure themselves or be injured if the vehicle makes sudden stops or turns.

When a seat belt or similar conventional restraint is used, the detainee's handcuffed hands are pressed into the seat back, making the handcuffs cut in to the detainee's wrists and possibly placing strain on the front of the detainee's shoulder joints, which may cause a shoulder injury. Additionally, detainee's often attempt to rid themselves of any contraband by pushing it into the space between the seat back and the seat bottom. Officers must check this space between each arrest by placing their hands into the space. This can be dangerous for the officers, particularly if a needle, knife or other sharp object has been placed in this area.

Additionally, despite being handcuffed, a prisoner may still assault a police officer in the front seat of the vehicle by spitting through a metal screen or grate that separates the prisoner from the front seat.

Upon reaching a destination, the handcuffed person must be safely removed from the vehicle, creating additional opportunities for injury.

Therefore, placing a handcuffed prisoner in a vehicle for transport by law enforcement may be difficult if the prisoner is unwilling to cooperate and may provide opportunities for the prisoner to assault law enforcement personnel. In order to avoid injury, law enforcement personnel may not restrain the prisoner during transport.

Accordingly, an invention is needed to provide a seat with integrated restraints which safely restrains a prisoner or detainee during transport, protects the prisoner's handcuffed hands and shoulders from injury while restrained, provides an easily accessible location for items in the detainee's hands to be dropped, protects transporting law enforcement personnel from assault, and which can be slid out of the vehicle for safe passenger placement and restraint in the seat while outside the confines of the vehicle.

SUMMARY OF EMBODIMENTS

The present invention discloses a movable seat for a law enforcement vehicle, including a method of use.

The seat moves along a track system mounted to the vehicle by a vehicle mount, allowing the seat to move completely out of the vehicle thereby allowing a passenger to be placed and safely restrained in the seat while still outside the vehicle. Once the passenger is restrained, the seat moves back into the vehicle along the track system.

Embodiments of the invention comprise additional features which add to the ease of use, and to the safety of the passenger and participating law enforcement personnel during transport.

Disclosed is a vehicle seat for use in a vehicle including a seat having a seat back and a seat bottom. A track system is coupled to the seat and to a vehicle mount. At least one restraint is also coupled to the seat. In some embodiments, a vehicle seat for use in a vehicle with an uncooperative passenger may include a seat having a seat back and a seat bottom. A track system is coupled to the seat. A vehicle mount is coupled to the track system and configured to couple to the vehicle. An opening is formed in the seat back and configured to receive restrained hands of a passenger.

Alternate embodiments may include any of the following: the seat bottom is between 16 inches and 20 inches in length; a passenger who is unwilling to enter the vehicle; a face mask coupled to the seat; the face mask may be coupled to the seat by a swivel mechanism, wherein the face mask can move from a first mask position into a second mask position in front of the face of a passenger seated in the vehicle seat; the seat is coupled to the track system by a swivel mount; the vehicle seat may also include at least one step coupled to the seat; and a leg restraint coupled to the at least one step, wherein a passenger's legs may be restrained on the at least one step by the leg restraint.

In some embodiments, the vehicle seat further includes a ladder coupled to the seat. In other embodiments, the restraint includes a four-point harness. In additional embodiments a vehicle seat includes an opening, wherein the opening is configured to receive a handcuffed pair of hands of a passenger seated in the seat.

Disclosed is a vehicle seat for use in a vehicle with an uncooperative passenger which may include a seat having a seat back and a seat bottom. A track system is coupled to the seat. A vehicle mount is coupled to the track system and configured to couple to the vehicle. An opening is formed in the seat back and configured to receive restrained hands of a passenger.

In some embodiments, an actuator is coupled to the track system and wherein the seat is configured to move between a first position inside the vehicle and a second position outside the vehicle in response to the actuator. In other embodiments, the second position is in the rear of the vehicle. Additionally, the second position may be lower than the first position. In alternate embodiments, the vehicle seat further includes a restraint system coupled to the seat and wherein the restraint system moves from a first position to a second position with the seat. In some embodiments, the restraint system is a four point harness.

Disclosed is a seat for use in a law enforcement vehicle with an uncooperative passenger including a seat having a seat back and a seat bottom. A four point harness system may be coupled to the seat. The seat back may also include an opening, wherein the opening is configured to receive a restrained pair of hands of a passenger seated in the seat.

In some embodiments, the seat further includes a face mask coupled to the seat. In other embodiments, the seat includes at least one leg restraint proximate the seat. In additional embodiments, the seat back and the seat bottom are formed from a washable material.

Additionally, disclosed is a method of securing an uncooperative passenger in a vehicle, having the steps of retracting a vehicle seat from a first seat position inside the vehicle to a second position outside the vehicle; seating a passenger in the movable seat; restraining the passenger in the vehicle seat; and returning the vehicle seat to the position inside the vehicle. In some embodiments, the method further comprises positioning a face guard in front of a face of the passenger.

Further embodiments of a method of restraining a detainee within a vehicle include the steps of: opening a door on a vehicle comprising a movable seat; retracting the movable seat from a first position in the vehicle to a second position adjacent the door of the vehicle; and seating a detainee in the movable seat of the vehicle. The detainee's hands are restrained behind its back. Therefore, the method also includes positioning the detainee's hands in an opening in a back of the movable seat; restraining the detainee in the movable seat with a seat belt coupled to the movable seat; returning the movable seat to the first position inside the vehicle; and closing the door on the vehicle.

Still more embodiments of a method of restraining a detainee in a law enforcement vehicle include the steps of: opening a rear door of a law enforcement vehicle; pressing a button to cause a movable seat to travel from a first position within the law enforcement vehicle to a second position adjacent the rear door of the law enforcement vehicle; positioning the detainee in the movable seat with the detainee's hands restrained behind the detainee; placing the detainee's hands through an opening in the movable seat so that the detainee's hands are in a position behind the movable seat; holding the detainee in the movable seat; restraining the detainee in the movable seat with a seat belt coupled to the movable seat; pressing a button to cause the movable seat to travel from the second position to the first position within the law enforcement vehicle; and closing the rear door of the law enforcement vehicle.

Finally embodiments of a method of transporting a detainee in a vehicle includes the steps of: restraining a detainee's hands; opening a door of a vehicle; retracting a movable seat from an interior of the vehicle to a location adjacent the door of the vehicle; positioning a detainee in the movable seat with the detainee's hands behind the detainee in an opening in the movable seat; restraining a detainee in the movable seat with a seat belt coupled to the movable seat; returning the movable seat to the interior of the vehicle; closing the door of the vehicle; driving the vehicle to a desired location; opening the door of the vehicle; retracting the movable seat from the interior of the vehicle to the location adjacent the door of the vehicle; releasing the detainee from the seat belt coupled to the movable seat; removing the detainee from the movable seat; returning the movable seat to the interior of the vehicle; and closing the vehicle door.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
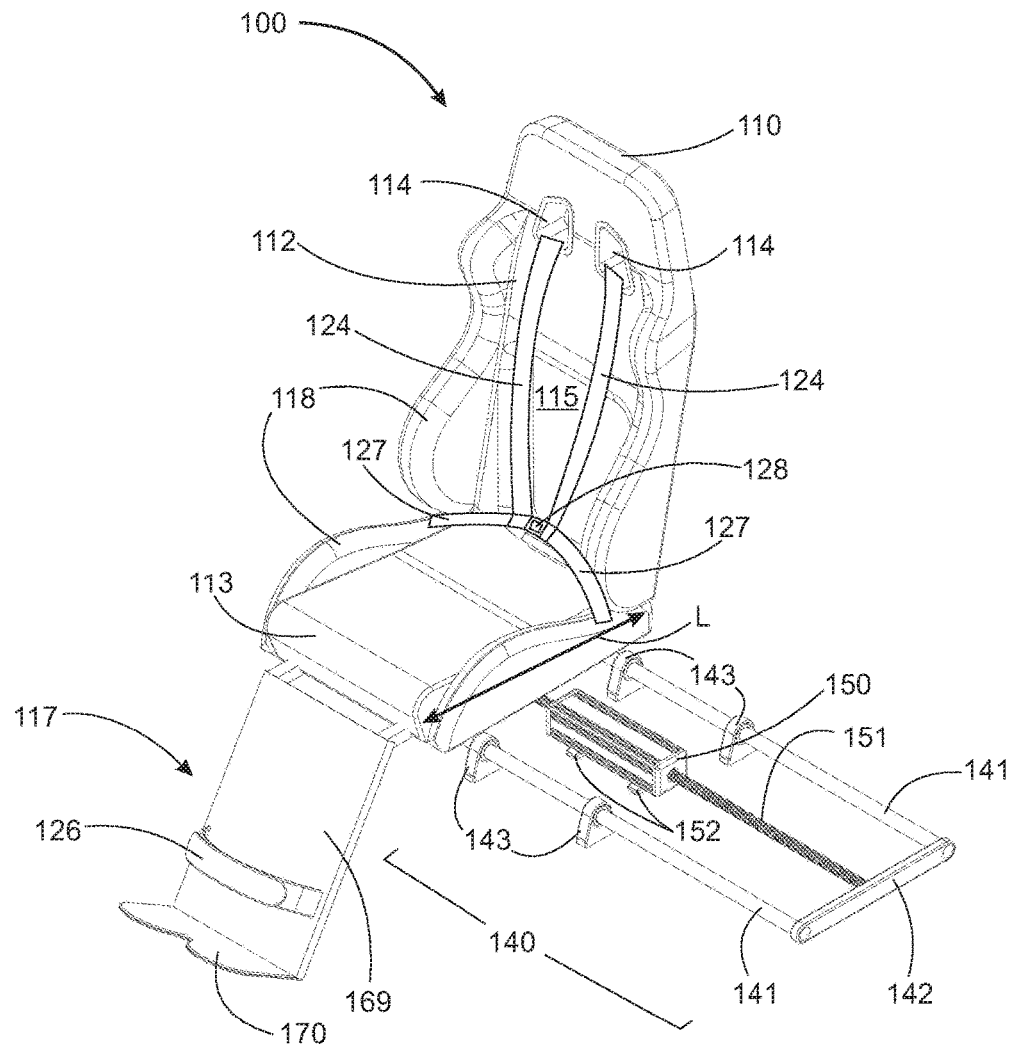
FIG. 1 is a top isometric view of a vehicle seat for a vehicle in a first seat position.

Embodiments of this invention disclose a seat for a law enforcement vehicle, including a method of use. The seat includes a four point harness. Additionally the seat has an opening in the seat back for a detainee's restrained hands. The seat also slides along a track system mounted to the vehicle by a vehicle mount, allowing the seat to move completely out of the vehicle thereby allowing a passenger to be placed and safely restrained in the seat while still outside the vehicle. Once restrained, the seat moves back into the vehicle along the track system. Embodiments of the invention include additional features which add to the ease of use, and to the safety of the passenger and participating law enforcement personnel during transport. Examples of these additional features include a movable face mask mounted to the seat which may be positioned in front of the passenger's face to prevent the passenger from spitting on officers in the front seat, and a step mounted to the chair to allow the passenger to be more securely positioned and restrained in the vehicle seat.

Additionally, a method of using a vehicle seat is disclosed. Finally, various alternative methods of use are disclosed. The drawing figures are used to illustrate a representative embodiment of the device itself and various methods of use, and in no way are intended to limit the disclosed invention to the embodiments shown in the figures. They are described fully herein below.

It is to be understood that some of the terms used herein to disclose the elements and various embodiments of the present invention may have broad meaning according to at least the definitions provided herein below. "Vehicle" is any conveyance for transporting a person. Most commonly, "vehicle" is an automobile; van, including cargo or multi-passenger van; truck, including full-size truck, small truck, sport utility vehicle, or the like, although this is not meant to be limiting. As used extensively herein, "vehicle" is often a government vehicle, such as a police car, a police van, a prisoner transport van or a bus. "Vehicle" may be a single passenger or multi-passenger conveyance. "Passenger" is any person in a vehicle seat as disclosed herein. As used herein, "passenger" most commonly refers to a prisoner, mental-health patient, invalid, other detainee, or similar person who is detained against his will and may be unco-operative, posing a danger to himself and/or to the other vehicle occupants during transportation of the passenger in the vehicle. "Custody" means detained, for any length of time whatsoever, by a government official, such as a police officer for example; or by a private person under court order, such as a behavioral health worker. A person in custody is a detainee, although not all detainees are necessarily in custody. "Law enforcement personnel" means a second person in the vehicle involved with the transport of the passenger, and may or may not be the driver of the vehicle. Most commonly, "law enforcement personnel" is a police officer, a marshal, sheriff, or similarly situated government official. "Law enforcement personnel" may be employed by the local, state or federal government or the like. "Law enforcement personnel" may also be a private citizen working for a prison, a member of the military, a bounty-hunter, a federal border-patrol officer, or the like. Additionally, it is anticipated that private individuals such as security guards may employ the invention and may fall under the definition of "Law enforcement personnel".

While this invention has many uses within law enforcement, it is also anticipated that this invention may have uses in other industries or arts. I.e. this invention may be used for individuals who are in ill health and are not capable of buckling themselves into a vehicle, by allowing the harness system to move with the seat to a location outside of a vehicle, sick individuals may be more conveniently aided in buckling themselves in.

FIGS. 1-4 illustrate front views of a vehicle seat 100 for use in a vehicle. Vehicle seat 100 is configured for use in a vehicle such as in the rear seat of a police car.

Vehicle seat 100 includes a seat 110. Seat 110 is used to hold a passenger. The passenger sits in seat 110 and is restrained in seat 110. Accordingly, seat 110 is any suitable chair, bench, or car seat-like device that is strong enough and sized appropriately to hold a passenger. Seat 110 may be formed from any material desired. Seat 110 may be soft for comfort or it may be firm in order to increase the life of the seat 110 and decrease the absorption of the seat 110. It is likely desirable that seat 110 will be of a firmness between soft and firm. A seat 110 that is soft enough for reasonable comfort would also likely be firm enough to withstand the abuse placed on it when detainees or passengers are being transported.

Seat 110 may also be formed from a washable material, such as a water resistant or stain resistant material. Often when detainee's are being transported, they may spill, vomit, defecate, urinate or the like onto the seat 110. Therefore the ability of the seat 110 material to resist these types of substances is very important. Seat 110 may be formed from polymers, plastics, metals, fiberglass, wood or the like.

It may also be desirable to form seat 110 from a material which resists tears, punctures or cuts. Often detainees or passengers enter the seat 110 with needles, knives or the like. It is desirable that seat 110 be durable enough to endure abuse from some of these items.

Seat 110 may also be constructed from durable materials; typically as a unitary body formed using injection-molded plastic. In some embodiments, seat 110 is constructed from plastics using cutting or techniques as alternatives to injection molding, from Kevlar® or similar strong, lightweight carbon-fiber materials; from cast or machined aluminum, other metal, or metal alloy; and the like. Plastics and the like have the added benefit of being hygienic and washable. In some embodiments, seat 110 is constructed entirely of a washable material. In some embodiments, seat 110 is constructed from a combination of materials and manufacturing techniques known to those in the art.

Seat 110 further includes a seat back 112. Seat back 112 is illustrated as a race car seat type seat back 112. Seat back 112 is also illustrated as a rectangular shape having a rise or ridge 118 on both sides of the seat back 112. When seat back 112 is in use, ridges 118 will be approximately parallel to the passenger's spine. These ridges 118 help to prevent the passenger from moving around while they are being transported. Additionally, should the passenger become unconscious during transport, ridges 118 may help to prevent the passenger's head from bouncing around and causing injury.

Seat back 112 may also be any shape desired such as square, triangular, circular, half circular, arched or the like. Additionally, seat back 112 may have other indentations or ridges in order to better conform to the shape of a passenger's or detainee's body. Seat back 112 may also have no ridges or indentations. Instead Seat back 112 may be perfectly flat. Seat back 112 may be any shape, size or contour that serves the desired purpose.

Seat back 112 also includes an opening 115. A passenger transported utilizing vehicle seat 100 will almost always be handcuffed or otherwise restrained in a body position with his-or-her hands behind the back. In conventional vehicle seats, this presents a problem—the handcuffed or restrained hands of the passenger prevents the back of the passenger from fully resting against the seat back of a conventional vehicle seat. It may also be painful for a handcuffed person to be seated with pressure from the person's body pinning the handcuffed person's hands against a solid, unyielding seat back. Such pressure causes the handcuffs to dig into the person's wrists and/or hands, depending upon how the handcuffs are placed. Accordingly, seat back 112 may further have, include or comprise an opening 115. Opening 115 is an opening extending through-and-through a seat back 112 of seat 110, located such that the handcuffed or restrained hands of a passenger are received through opening 115 and allow the passenger to rest firmly against seat 110 at all points while reducing the chance of injury to the passenger's wrists and/or hands and possibly shoulders from pressure against his or her handcuffed or restrained hands against a seat back.

Additionally, should the passenger have evidence, weapons or the like in their hands that they are trying to hide, the evidence or the like will fall through the opening 115 into an easily accessible location behind or under seat 110.

As shown in the embodiment depicted by FIG. 1 and other drawing figures, opening 115 is large relative to the portion of seat 110 wherein opening 115 is located. The relatively large opening 115, is useful because a larger opening 115 accommodates a large range of passenger heights. This is not, however, meant to be limiting. In some embodiments, opening 115 may be substantially smaller. Additionally, in some embodiments, opening 115 comprises a shape different than the generally inverted irregular pentagon shown by FIG. 1 and the other drawing figures, such as a different polygon, a rectangle, an oval, or the like.

Seat bottom 113 is coupled to seat back 112. As illustrated in the figures, it may be desirable to have seat bottom 113 and seat back 112 formed as a continuous piece. Forming seat bottom 113 and seat back 112 as one continuous piece eliminates the space or crack between the seat bottom 113 and seat back 112. When passenger's who are being detained by law enforcement are placed in a vehicle, the passenger's often have contraband in their possession. This contraband may include illegal drugs, weapons, needles or other evidence. Often passenger's attempt to hide this evidence by forcing it into the crack between the seat bottom 113 and the seat back 112. Law enforcement personnel such as police officers have to check in the opening between the seat bottom 113 and the seat back 112 between each detainee. Frequently, sharp items are found in the opening. Sometimes these items may injure law enforcement personnel as they are being retrieved. Therefore, it is desirable to eliminate the opening between the seat bottom 113 and the seat back 112. By forming the seat bottom 113 and seat back 112 as one continuous piece, this opening is eliminated.

Alternate methods of eliminating the opening between the seat bottom 113 and seat back 112, include, coupling the seat bottom 113 and seat back 112 together in such a way that there is no opening or crack between the two pieces or the like.

In some embodiments, L, which represents the length of seat bottom 113, is between 22 and 24 inches. Traditionally vehicle seats tend to fall within the range of 22 to 24 inches in length. In alternate embodiments of seat 110, L may be between 17.5 and 18.5 inches. In some embodiments, L is 16 inches. In some embodiments, L is between 16 inches and 18 inches. Embodiments wherein L is shorter than approximately 22 inches allow for greater maneuverability when seating passengers into seat 110, and greater clearance through a vehicle door when moving seat 110 between a first seat position and a second seat position, where the first seat position is located within a vehicle and the second seat position is located outside of a vehicle.

Seat 110 also has, includes, contains or comprises at least one strap hole 114. Two strap holes 114 are illustrated in the figures. The two strap holes 114 are illustrated as polygonal openings that are almost rectangular or trapezoidal. The strap holes 114 travel completely through the seat back 112.

The strap holes 114 are configured to receive harness 125. Harness 125 is a four point harness with two shoulder straps 124 that extend through strap holes 114, down the front of the seat 110 and are coupled to two lap belts 127 at or proximate buckle 128. The shoulder straps 124 travel through the two strap holes 114 and are coupled in place at the back of the seat 110. The shoulder straps 124 may be coupled into place with a coupler such as a bolt, screw or the like. The coupler must, however, be strong enough to withstand the force of a passenger trying to escape the harness 125. Additionally, the coupler must be strong enough to withstand the force of an accident.

Alternately, the shoulder straps 124 may be coupled into place by connecting to the other pieces of the harness 125. I.e. the lap belts 127 may be coupled to the shoulder straps 124 at the back of the seat 110. Having the belts 127 and straps 124 coupled together keeps them securely in place.

The lap belts 127 travel from the sides of the seat 110 and are coupled to the shoulder straps 124 at buckle 128. The lap belts 127 may be coupled to the back or sides of the seat 110 with a coupler such as a bolt or a screw. Alternately, the lap belts 127 may be coupled in place by being permanently coupled to the shoulder straps 124 at the back of seat 110.

The lap belts 127 and the shoulder straps 124 may be formed from any material strong enough to withstand the force from a fighting and writhing adult. Additionally, the material must be strong enough to withstand the force of an accident. It is likely, however, that the lap belts 127 and the shoulder straps 124 may be formed from nylon webbing, Kevlar webbing or polyester webbing such as that use for standard seat belts.

Additionally, the lap belts 127 and shoulder straps 124 may be formed in any size, length or color desired. The lap belts 127 and shoulder straps 124 may also automatically adjust in length in order to securely restrain the passenger.

Figure 3:
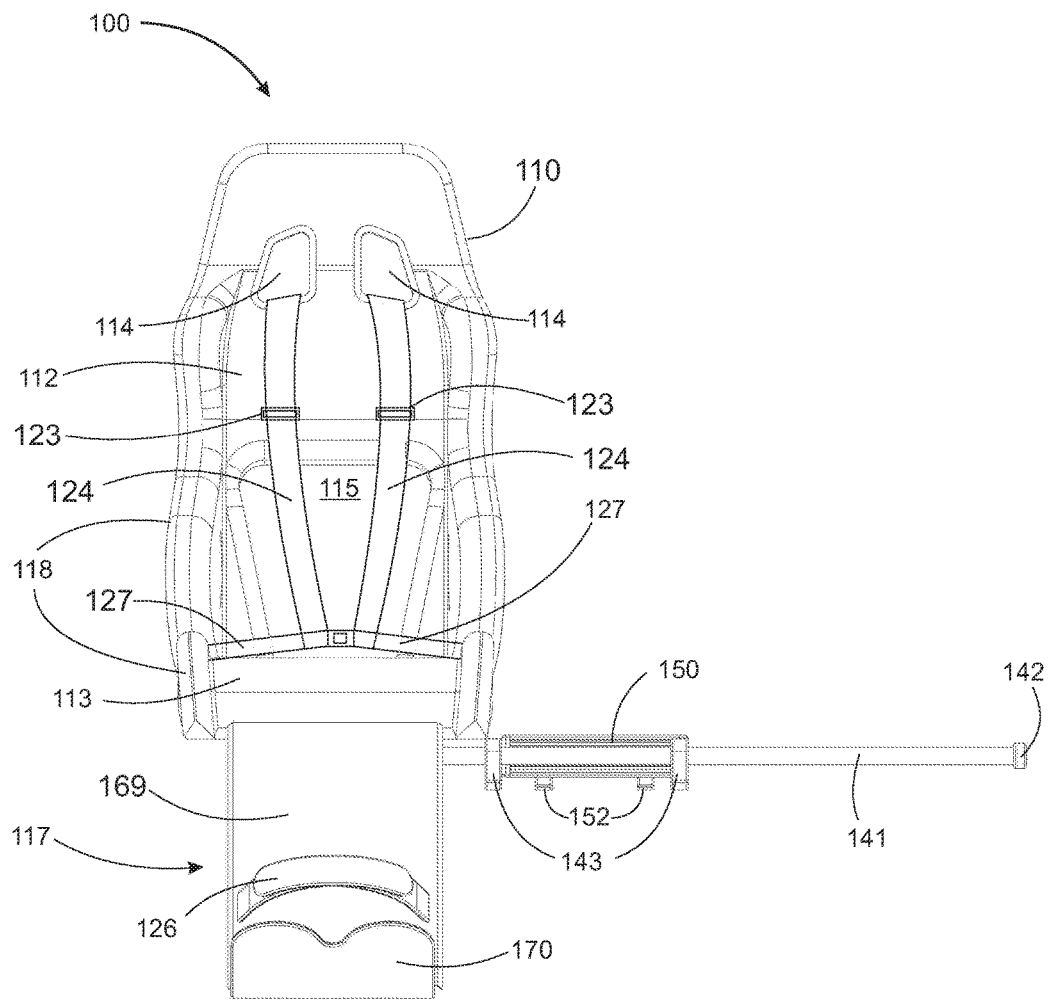
FIG. 3 is a front view of a vehicle seat for a vehicle in a first seat position.
Figure 4:
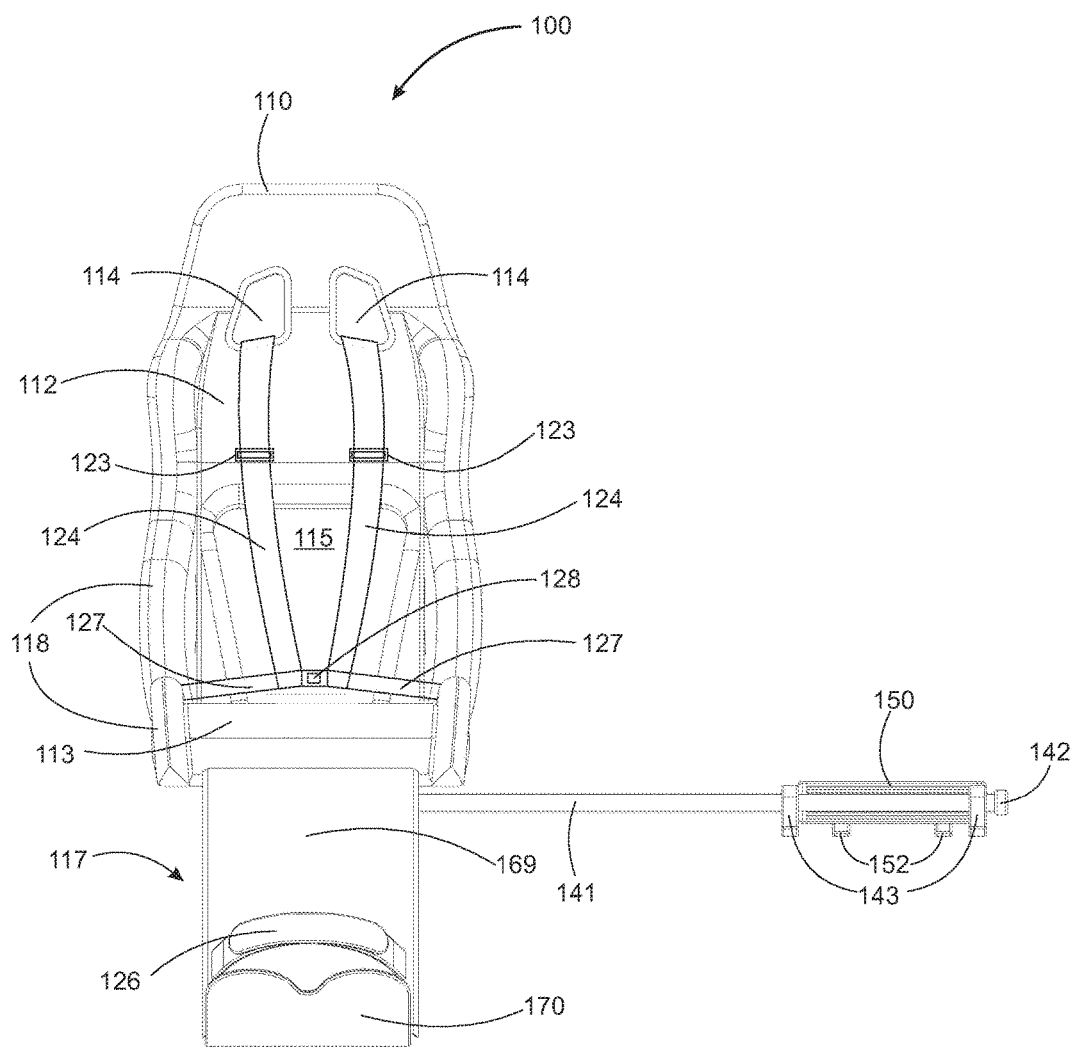
FIG. 4 is a front view of a vehicle seat for a vehicle in a second seat position.
Figure 7:
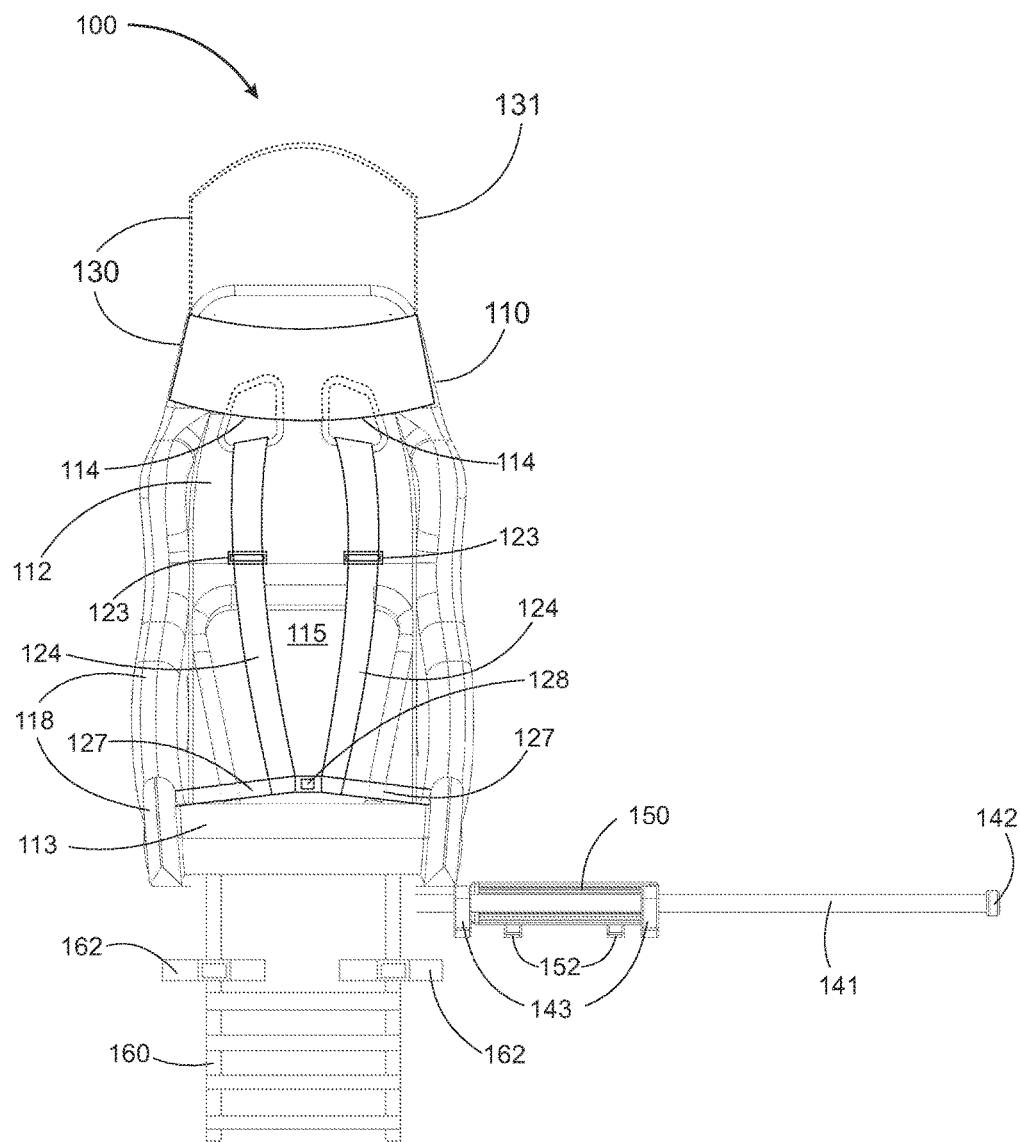
FIG. 7 is a front view of movable seat for a vehicle in a first seat position with a face mask.

The lap belts 127 and shoulder straps 124 may also be manually adjustable in length so that the law enforcement officer may determine the tightness of the harness 125 for each individual passenger or situation. FIGS. 3, 4 and 7 illustrate a harness 125 with belts with manually adjustable lengths. Shoulder straps 124 in these figures have adjusters 123. Adjusters 123 may be used to cinch the shoulder straps 124 tighter or may be used to lengthen the shoulder straps 124 if needed. Adjusters 123 may be any type of belt lengthener or shortener that can withstand the force of an accident or a struggling passenger.

The lap belts 127 and the shoulders straps 124 are coupled together in the front of the passenger at buckle 128. In typical four point harnesses 125, the shoulder straps 124 are permanently or adjustably coupled to the lap belts 127 at a point along the lap belts 127 proximate, but prior to buckle 128.

Buckle 128 further consists of a tongue which is the male portion of the buckle 128 and the buckle portion of the buckle 128. The tongue is pushed into the buckle in order to lock two portions of a belt together. The tongue of the buckle 128 is permanently coupled to one of the two lap belts 127. The buckle portion of the buckle 128 is coupled to the second of the two lap belts 127.

When a passenger is placed into the seat 110, the shoulder strap 124 is placed over the passenger's shoulder with the passenger's arm extending through the opening created by the shoulder strap 124 and the lap belt 127. The same procedure is completed with the second of the passenger's arms. The buckle 128 then locks the two portions of the lap belt 127 together across the passenger's lap.

The buckle 128 may be configured as described above, or it may be configured in any way desirable.

Alternate embodiments may include the shoulder straps 124 each having an individual buckle that buckles to a section of the lap belt 127 and then the two sections of the lap belt are buckled together with buckle 128

The harness 125 may also be any type of harness desirable. A four point harness 125 is depicted in the figures and described herein, however, a five point, three point, or even two point harness may also be utilized with the vehicle seat 100.

A step 117 is also coupled to the seat 110. The step 117, as illustrated, consists of a small platform 170 coupled to the seat 110 by a larger rectangular surface 169. The step 117 allows a passenger to easily enter the seat 110. The step 117 is particularly useful if the vehicle, which the passenger is being placed in, is tall such as a truck, SUV or the like.

The platform 170 of the step 117 may be formed in any size or shape desired. The figures illustrate a step 117 platform 170 which has two extended portions for placement of the passenger's feet. A decrease in the width of the step 117 platform 170 is located between the two extended portions of the platform 170.

Alternate embodiments of the step 117 platform 170 include a rectangle, square, oval or other shaped platform 170. The platform 170 could also have vertical or horizontal contours in order to more comfortably support the passenger's feet. The vertical contours could be indentations or rises on the platform 170.

The step 117 also consists of a rectangular surface 169 which connects to the platform 170. The surface 169 simply acts as a support to the platform 170 and fills in the empty space between the seat 110 and the platform 170. The surface 169 may, additionally, prevent the passenger from getting their feet caught behind the platform 170. The surface 169 may be formed in any size or shape desired.

The step 117 may be formed in any size or shape desired and from any material desired, such as metal, composites, polymers and the like. The step 117, however, must be formed from a material that is strong enough to support the weight of a large grown man who may be jumping, a heavy passenger or the like. Therefore, the step 117 must be particularly strong and robust.

Figure 5:
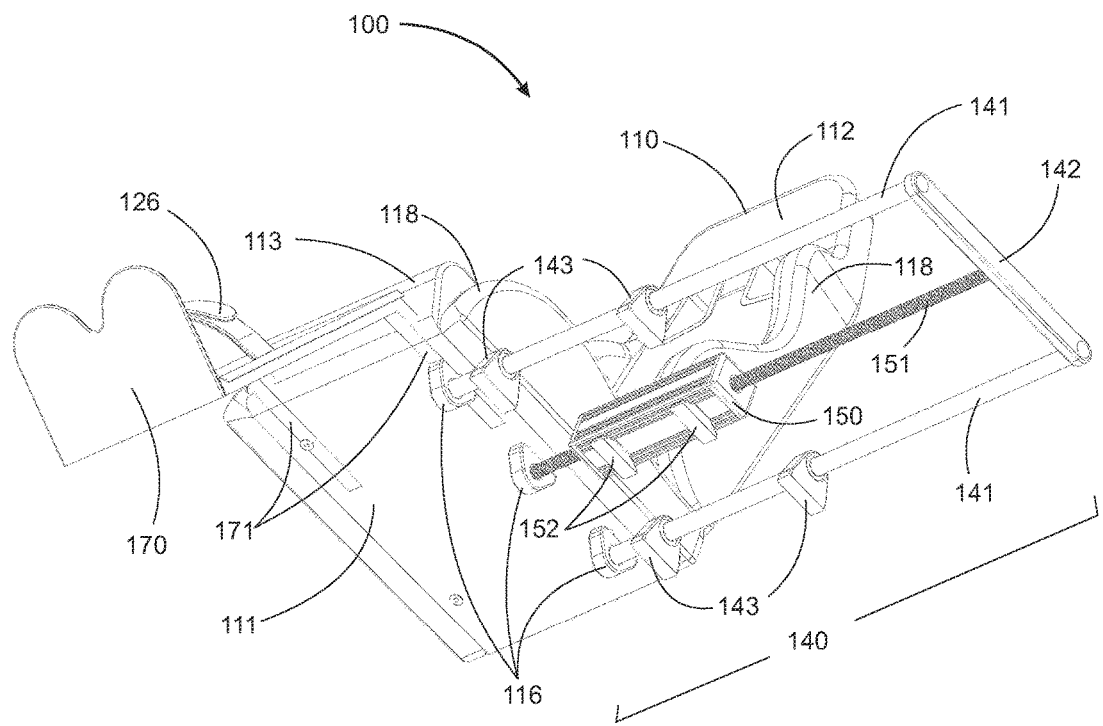
FIG. 5 is an isometric bottom perspective view of a vehicle seat for a vehicle in a first seat position.
Figure 6:
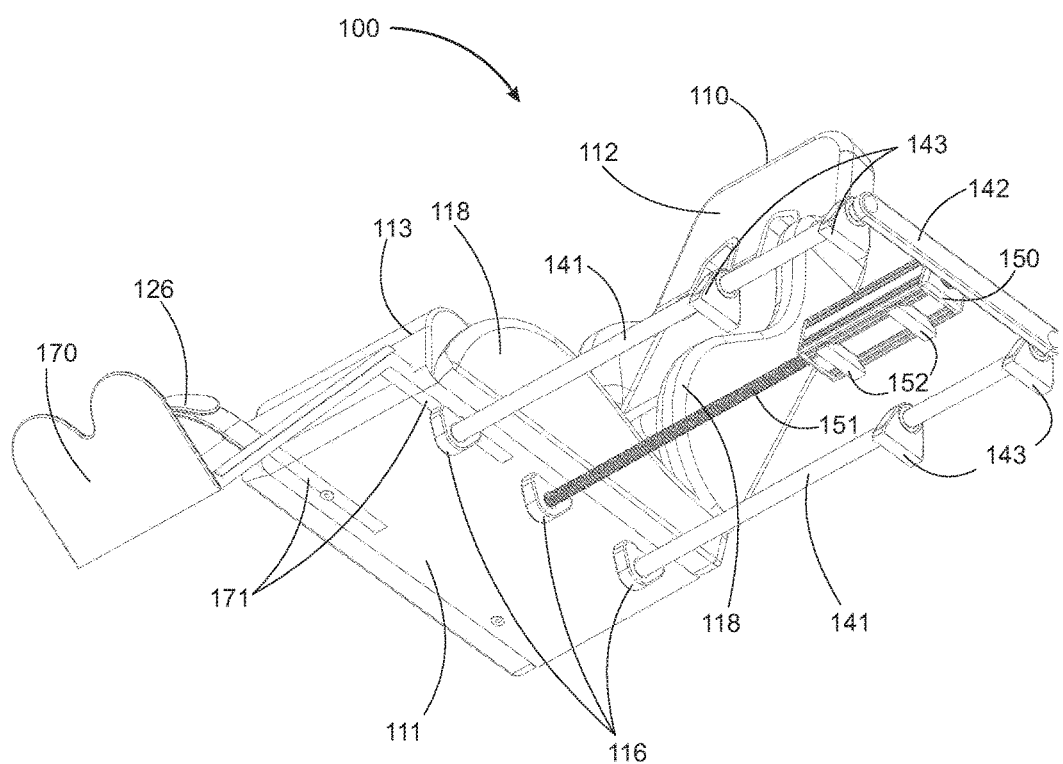
FIG. 6 is an isometric bottom perspective view of a vehicle seat for a vehicle in a second seat position.

The step 117 is coupled to the seat 110 by the step couplers 171 which are illustrated in FIGS. 5-6. The step couplers 171 are illustrated as long slender members which are coupled to both the surface 169 of the step 117 and to the bottom 111 of seat 110. The step couplers 171 may be coupled to the surface 169 and/or the bottom 111 of the seat 110 by a screw, bolt, adhesive, welding, epoxy or the like. Additionally, the step couplers 171 may be formed in any size, shape or from any material desired.

Leg restraints 126 may be coupled to step 117. Leg restraints 126 are a strap, chain, belt or other restraint which is coupled to the step 117 and which is placed around the passenger's legs or ankles in order to secure them in place. Leg restraint 126 may consist of one strap which secures both of the passenger's legs together or multiple leg restraints 126 may be used in order to secure each of the passenger's legs individually.

The leg restraints 126 may be a leather belt, a webbing belt such as that used for a seat belt, a metal bracelet/band or the like. Additionally, the leg restraint 126 may also simply be a location that a pair of leg manacles may be attached to the step 117.

The seat 110 is coupled to a track system 140 which may be used to move seat 110 from a first position inside a vehicle to a second position outside of a vehicle.

The track system 140 may consist of, include or comprise at least one track 141. The embodiment illustrated in the figures includes two tracks 141. Multiple tracks 141 increase the stability of seat 110 when it is in the second position outside of the vehicle. The tracks 141, as illustrated, are cylindrical rods or tubes. These rods may be formed from metal, plastic, fiberglass or the like. The tracks 141, however, must be strong enough to support the seat 110 outside of the vehicle without bending significantly or breaking. Additionally, should the tracks 141 bend permanently it could impair the ability for the seat 100 to function. Therefore, the tracks 141 must be particularly strong and resilient.

The tracks 141 may also be formed in other shapes such as a channel, a rectangular or square cross sectional bar or the like. The tacks 141 may have a solid cross section or may be hollow. The tracks 141 may also telescope or otherwise extend during the movement of seat 110 to the outside of the vehicle.

Tracks 141 are coupled to each other by cross member 142. Cross member 142 may be a long oval member which is coupled to the ends of tracks 141. The cross member 142 secures the tracks 141 together and provides stability to the track system 140. The cross member 142 may be formed in any shape or size desired such as a rectangle, square or the like. The cross member 142 may have a solid cross section or may be hollow. It may be desirable, however, to have the cross member 142 minimal in size so as to take up the least amount of space possible.

With a track system 140 comprising only tracks 141, the seat 110 may be manually slid along the tracks 141 from a first position inside a vehicle to a second position outside of the vehicle.

The track system 140, in general, and the tracks 141, in particular, may be removably or permanently mounted to a vehicle for use. Track mounts 143 are used to mount the tracks 141, in the track system 140 illustrated, to the floor of a vehicle. Track mounts 143 comprise a member which is illustrated as a rounded triangle, but may be shaped as a rectangle, square, circle, oval or any shape desired. It may, however, be desirable to use a shape with one flat edge so that the track mount 143 may be easily mounted to the floor of a vehicle.

The flat edge of the track mount 143 is removably or permanently coupled to the floor of a vehicle. The track mount 143 may be coupled by using adhesive, screws, bolts, epoxy, hook and loop fasteners or the like. It is likely, however, that a very strong coupler will be required to prevent the track mounts 143 from coming loose during use.

The track mount 143 further comprises an opening through which tracks 141 are placed. The opening allows track 141 to move laterally without allowing the track to bounce around vertically. The opening in the track mount 143 may include a bearing or other lubricated surface in order to allow the track 141 to easily move through the track mount 143 during use. The track 141 will move through the track mount 143 as the seat 110 is moved from a first position or location with the vehicle to a second position or location outside of the vehicle. When the seat 110 is at the second position outside of the vehicle, the most stress will be placed on the track mount 143 as a passenger is placed in seat 110 and the track 141 acts as a lever applying force to the track mounts 143. Therefore, the track mounts 143 must be formed from a material and in a manner that causes them to be extremely strong. The track mounts 143 may be formed from metal, wood, polymer, composites, fiberglass or the like.

In the figures, an actuator 150 and an actuator screw 151 are also included in the track system 140. The actuator screw 151 is coupled to the cross member 142 along with the tracks 141. The actuator screw 151 is a threaded rod that runs parallel to the tracks 141.

In alternate embodiments, the actuator screw 151 may be replaced with a chain and sprocket system or the like. The actuator screw 151 may be any device that creates linear movement of the seat 110 when movement or power is applied to it.

An actuator 150 is movably coupled to the actuator screw 151. The actuator 150 acts to automatically move seat 110 from a first position within a vehicle to a second position outside of the vehicle and back as desired. As disclosed in the figures, actuator 150 may be a linear screw actuator coupled to actuator screw 151. Actuator screw 151 is, in turn, coupled to track system 140 at cross member 142. In some embodiments, actuator screw 151 does not rotate; rather, actuator screw 151 is fixed and translates rotational motion of actuator 150 to linear motion of track system 140, wherein activation of actuator 150 causes movement of track system 140 along the continuous range of positions between first seat position and second seat position.

Additionally, actuator 150 may be any type of motor which provides linear movements through a screw 151 or the like to the seat 110 or to the track system 140. The actuator 150 causes seat 110 to move from a first position within a vehicle to a second position outside of a vehicle and back.

Actuator 150 may be powered by a vehicle's electrical system. A vehicle's electrical system includes power from the vehicle when the vehicle is running or power from the vehicle's battery when the vehicle is turned off. Alternatively, an actuator 150 may be powered by its own power source, such as a battery located proximate to the actuator 150, a solar cell or the like.

In some embodiments, actuator 150 further comprises an actuator control (not shown), wherein actuator control initiates and ceases movement of seat 110 along track 141 by regulating power supplied to actuator 150. In some embodiments, actuator control is activated by a switch near a door of a vehicle, such as a side door or a rear door, wherein personnel responsible for securing passenger into seat 110 may conveniently operate actuator control 113 while in proximity to vehicle seat 100 and passenger to transition seat 110 between first seat position and second seat position. In some embodiments, actuator control is activated by a switch in accessible by a person seated in the driver's seat or cab of a vehicle. In some embodiments, actuator control may be a wireless finger-operated button, commonly known as a FOB. A switch activating actuator control may be any kind of switch known to those in the electric control arts, including but not limited to a solid-state device, an electronic device, a wireless device, and the like. In some embodiments, actuator control is activated by any one of a plurality of switches in a plurality of locations. Actuator control may also be activated remotely through a hand held remote, cell phone or the like.

An actuator control may be used to start and stop the actuator 150 and thereby start and stop movement of seat 110. Alternatively, the actuator 150 may automatically turn off when seat 110 reaches the ends of tracks 141.

The actuator 150 is mounted in position on the floor of the vehicle by actuator mounts 152 (see FIGS. 5 and 6). Actuator mounts 152 are illustrated as trapezoidal shaped members which couple to both the bottom of the actuator and the floor of the vehicle. Actuator mounts 152 may be permanently or removably mounted to both the vehicle floor and the actuator 150. Actuator mounts 152 may be mounted to the actuator 150 and to the vehicle floor with couplers such as bolts, screws, adhesive, epoxy, tape, hook and loop fasteners or the like. Typically, however, actuator mounts 152 should be coupled to both the actuator 150 and the vehicle floor by as strong a coupler as possible so that the actuator mounts 152 will remain mounted during use. Actuator mounts 152 may be formed from any material strong enough to withstand the forces applied to the actuator 150 as the seat 110 is moved to a second position outside of the vehicle and a potentially large and angry passenger is placed in the seat 110. The actuator mounts 152 may be formed from metal, wood, composites, polymers, plastics and the like.

In some embodiments, seat 110 is mounted to track system 140 by a seat mount 116 (see FIG. 5 and FIG. 6). While the figures, show three seat mounts 116 it is contemplated that one seat mount 116, two seat mounts 116 or multiple seat mounts 116 may be used to secure the seat 110 to the track system. Seat mounts 116 may be arched members, as illustrated, which are coupled to the bottom 111 of the seat bottom 113. The illustrated seat mounts 116 have an opening into which they receive part of the track system 140 in order to hold seat 110 in place. The seat mounts 116 unmoveably couple the ends of the tracks 141 and the actuator screw 151 to the seat 110. Therefore as the ends of the tracks 141 and the actuator screw 151 move into or out of the vehicle, the seat 110 moves also.

Alternate embodiments of a seat mount 116 may include triangular or square shaped seat mounts 116 which are coupled to the underside of seat 110 and which receive a portion of the track system 140 in order to secure the seat 110 to the track system. Additionally, the seat mounts 116 could simply be a bolt, screw or other coupling device which would secure the seat 110 directly to a portion of the track system 140.

Additional embodiments of a seat mount 116 may be stationary and not allow any movement of the seat 110 with respect to the portion of the track system 140 to which it is mounted. Seat mount 116 may, alternatively, allow the seat 110 to rotate or swivel with respect to the track system 140. Allowing the seat 110 to swivel with respect to the track system 140 it possible for the seat 110 to be rotated when the seat 110 is outside of the vehicle. By rotating the seat 110, law enforcement personnel may be able to position the seat 110 in such a way that it is easier to place and restrain a passenger in the seat 110, i.e, the seat 110 may be rotated ninety degrees so that the seat 110 is facing away from the vehicle. When the seat 110 is facing away from the vehicle, law enforcement personnel have more room to work on restraining the detainee because the vehicle door is no longer in front of the seat 110.

Figure 2:
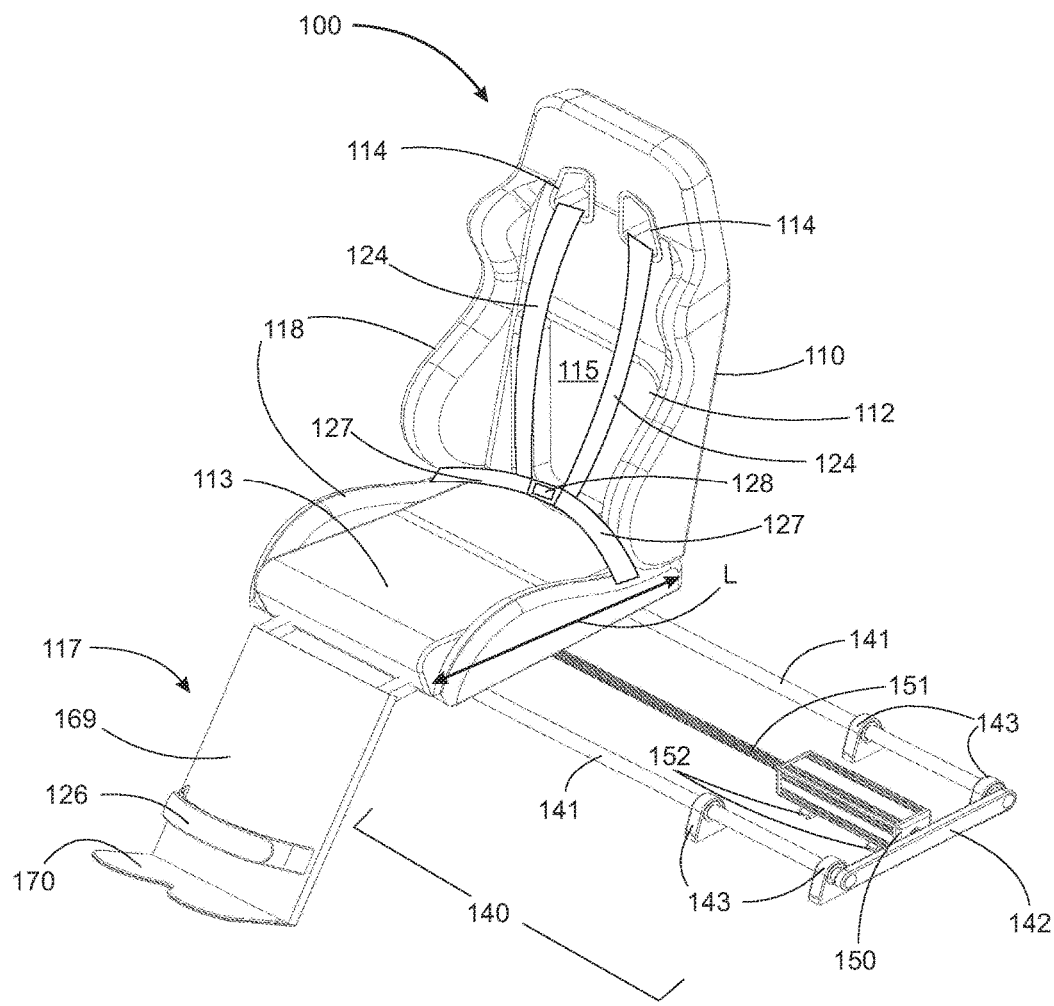
FIG. 2 is a top isometric view of a vehicle seat for a vehicle in a second seat position.

When movable seat 100 is in first seat position, as shown by FIG. 1, seat 110 is nearest crossbar 142 and fully within the confines of a vehicle. First seat position secures passenger within a vehicle in a position for operation of a vehicle. When the transport is completed, the vehicle is parked and seat 110 moves along track 141 away from crossbar 127 to second seat position. When in second seat position, as shown by FIG. 2, seat 110 is in a position on track 141 furthest from crossbar 142 and partially or fully outside the confines of a vehicle. Additionally, in some embodiments, seat 110 can be positioned at any location along track 141 between first seat position and second seat position. In some embodiments, such as the embodiment show in FIG. 1 and the other drawing figures, seat 110 faces a direction generally perpendicular to track 141. This and some similar embodiments of vehicle seat 100 are coupled to a vehicle such that seat 110 moves through a vehicle's side-facing door when passing from first seat position to second seat position. This is not meant to be limiting. In some embodiments, seat 110 faces a direction generally parallel to track 141, wherein vehicle seat 100 is coupled to a vehicle such that seat 110 moves through a vehicle's rear-facing door when passing from first seat position to second seat position.

In some embodiments, seat 110 can be locked in first seat position, second seat position, or any position along track 141 in a continuum between first seat position and second seat position. It is useful to lock seat 110 in first seat position during transport, to prevent seat 110 from sliding back-and-forth along track 141 during transport, risking injury to passenger and possibly destabilizing a vehicle in which vehicle seat 100 is mounted due to sudden shifting of passenger's weight within a moving vehicle. Additionally, it is useful to lock seat 110 in second seat position when dealing with an uncooperative and/or struggling passenger. A struggling, hostile detainee, even if handcuffed and manacled, is at risk of injuring himself and/or transport personnel. Locking seat 110 in one position, therefore, generally makes it easier and safer for personnel to place into or remove passenger from seat 110.

While the embodiments of the track system 140 shown in the figures allow only a horizontal movement of seat 110 from a position within a vehicle to a position outside of a vehicle and back, additional embodiments may include a system with arched tracks 141 which cause seat 110 to move from a higher position within a vehicle to a lower position outside of a vehicle. Additional alternate embodiments may involve seat 110 moving in a step like motion from a higher position to a lower position and the like.

FIG. 7 illustrates alternate features which may be included in embodiments of a vehicle seat 100. In this figure, a ladder 160 is illustrated in place of the step 117. The ladder 160 is formed with multiple cross members or rungs which allow a passenger to climb up the ladder 160 and into the seat 110. The ladder 160 may be useful in vehicles that are high off of the ground, such as trucks, SUVs and the like. The ladder 160 may be formed with any number of rungs or any length desired. The rungs may be as far apart or close together as desired as long as there is sufficient space between the rungs to allow a passenger to place their feet on the rungs.

The ladder 160 may be formed from any material that is strong enough to withstand the abuse of a full grown adult passenger with is uncooperative and may kick or jump on the ladder 160.

Leg restraints 162 are also illustrated in FIG. 7. Leg restraints 162 illustrate an alternate leg restraint 162 configuration. Leg restraints 162 are individual leg restraints 162 for use on each of the passenger's legs or ankles. Leg restraints 162 may be formed from webbing, leather or metal as desired.

Alternatively, leg restraints 162 may be replaced with a loop, clip or the like which would allow the law enforcement officer to clip existing manacles to the ladder 160.

Figure 8:
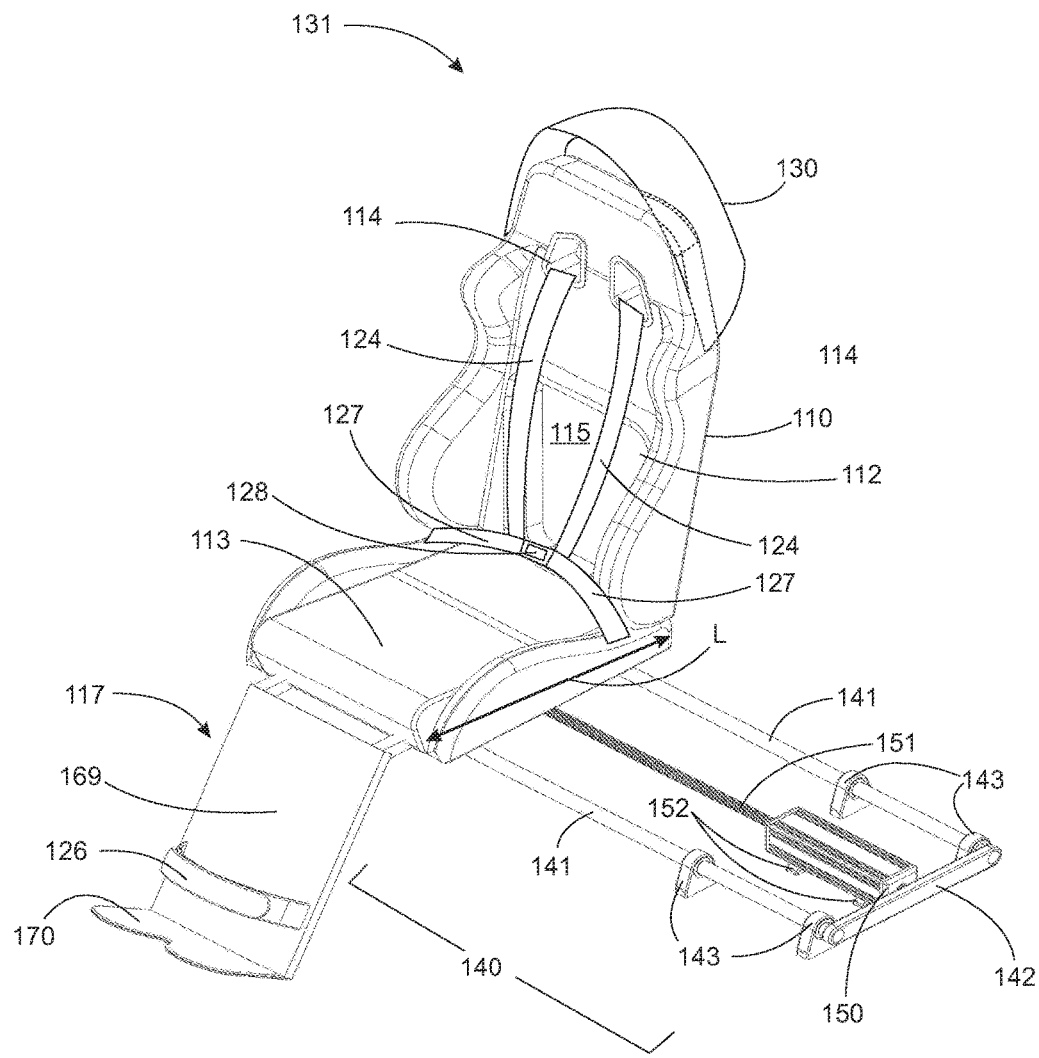
FIG. 8 is a top isometric view of a vehicle seat for a vehicle in a second position with a face mask.

FIGS. 7 and 8 additionally illustrate a face mask, face guard or spit shield 130. Face mask 130 is a shield which may be placed in front of the passenger's face in order to prevent them from spitting on the law enforcement officers. The face mask 130 may cover the front of the passenger's face and curve to include any rotation of the front of the passenger's face. Alternate configurations of the face mask 130 include a face mask that is cube shaped or partially cube shaped in order to encompass the passenger's face. Additionally, the face mask 130 may simply be a flat rectangular, square or other shaped piece of material that is placed in front of the passenger's face.

Face mask 130 is constructed from a clear, material, such as Plexiglas, glass, plastic or the like, which provides unobstructed vision for the passenger when face mask 130 is in front of the passenger's face and providing unobstructed vision for transport personnel or law enforcement officers within a vehicle of the face of a passenger. In some embodiments, face mask 130 further comprises a liner which may be removably placed over face mask 130 and later removed for cleaning or disposal. In some embodiments, a commercially available liner may be used in conjunction with face mask 130 of vehicle seat 100.

Face mask 130 may be coupled to seat 110 by a swivel mechanism 131, as shown in FIG. 7. Swivel mechanism 131 allows face mask 130 to be rotated away from the detainee's or passenger's face into a first position above and possibly slightly behind seat 110, when this is desirable, such as when the detainee is being placed into or being removed from seat 110. When detainee is restrained in seat 110, however, law enforcement or other personnel may rotate face mask 130 into a second position in front of the detainee's face wherein the detainee's face is obstructed by face mask 130, and wherein detainee cannot spit through a grate or other incomplete barrier between the back seat or prisoner area at law enforcement or other persons seated in the front of the vehicle. The face mask 130 also may help to prevent a detainee from spitting on a law enforcement officer when they are restraining the detainee into the seat 110 or when the seat 110 is moving into or out of the vehicle.

In some embodiments, swivel mechanism 131 allows face mask 130 to rotate in a sagittal plane to the left or to the right of a face of passenger. In some embodiments, swivel mechanism 131 allows face mask 130 to rotate to a position above the head of passenger.

The swivel mechanism 131 may be any type of mechanism that allows the face mask 130 to rotate such as a pin, a hinge or the like. The swivel mechanism 131 may also have an adjustable height using a mechanism similar to one used on a head rest in a vehicle. Being able to adjust the height of the face mask 130 allows the mask to be useful for both very tall passengers or detainees and very short detainees. The swivel mechanism 131 may be formed from any material that is strong enough to ender repeated torsional forces. Additionally, the swivel mechanism 131 may have to withstand abuse from passengers.

Alternatively, the face mask 130 may snap or clip into place on a mounting device on the chair 110.

Vehicle chair 100 will typically be mounted in the rear of a vehicle, however, it is anticipated that vehicle chair 100 may be mounted anywhere in a vehicle desired. Additionally, multiple vehicle chairs 100 may be mounted in the same vehicle.

Figure 9:
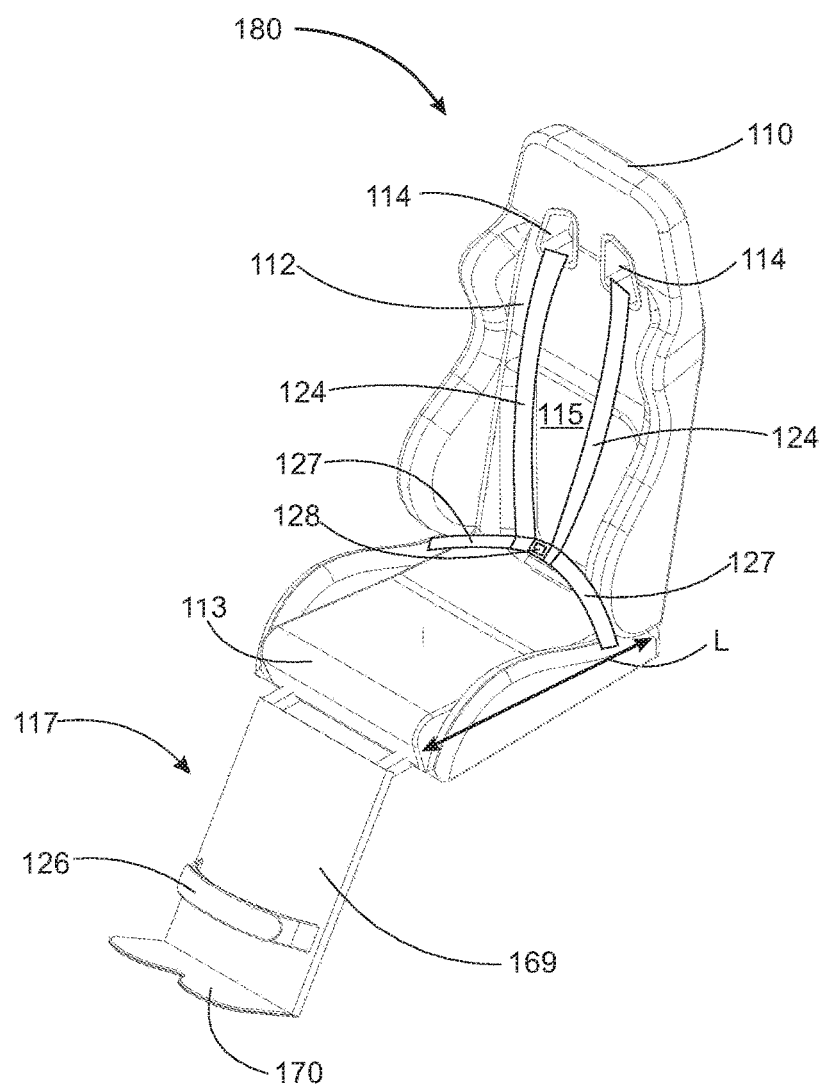
FIG. 9 is a top isometric view of a seat for a vehicle.

An additional embodiment of seat 110 is illustrated in FIG. 9 as seat 180. Seat 180 is configured identically to seat 110 as described previously, except that seat 110 is coupled directly to the vehicle itself. Seat 180 is coupled directly to a fixed structure on a vehicle, such as an existing seat mount, a floorboard, a vehicle frame, or the like. Use of seat 180, which does not include track system 140, may be desirable for applications wherein other features of vehicle seat 100 discussed previously, such as face mask 130 and/or an opening 115 and harness 125, are desired for transport of passenger but movement of seat 110 between a first seat position and a second seat position is not required. Seat 180 includes many of the same desirable features as discussed previously with respect to seat 110. Seat 180 includes a four point harness 125 which securely restrains and protects the passenger or detainee while they are being transported. Additionally, seat 180 includes a step 117 and leg restraint 126 which allow a law enforcement officer to completely restrain a passenger. Opening 115 is also included in the seat back 112 of seat 180. Opening 115 allows a hand cuffed prisoner to sit more comfortably and prevents the prisoner from stashing contraband or evidence in the seat 180. Instead, anything in the prisoner's hands would simply fall through opening 115 and into a location behind and/or below the seat 180 which is easily accessible for law enforcement personnel.

Seat 180 may also be shorter in length L as discussed previously in order to allow for more space and maneuverability for the individual restraining the passenger. Seat 180 may also include a face mask as illustrated in FIGS. 7 and 8.

Seat 180 may be coupled to the vehicle through use of screws, bolts, mounts, braces, adhesives, hook and loop fastener, or the like. It is likely to be desirable, however, to use a strong mount which can withstand the abuse from a detainee or passenger.

In some embodiments, a vehicle seat 100 may be coupled to a seat 180 within the same vehicle. For example, a vehicle seat 100 may be installed in the rear of a vehicle with rearward-opening doors and additional seat 180 coupled further forward in the vehicle, perhaps accessed by a side-facing vehicle door. In a vehicle such as a van or bus with greater than one row of seats, a vehicle seat 100 may be installed in one row and seat 180 coupled directly to the vehicle may be installed in a second row. Advantages to the use of seat 180 include the ability to place a plurality of seats 180 in a single transport vehicle for transport of a plurality of passengers. Examples include installation of seat 180 in a van, a bus, or other multi-passenger vehicle.

Figure 10:
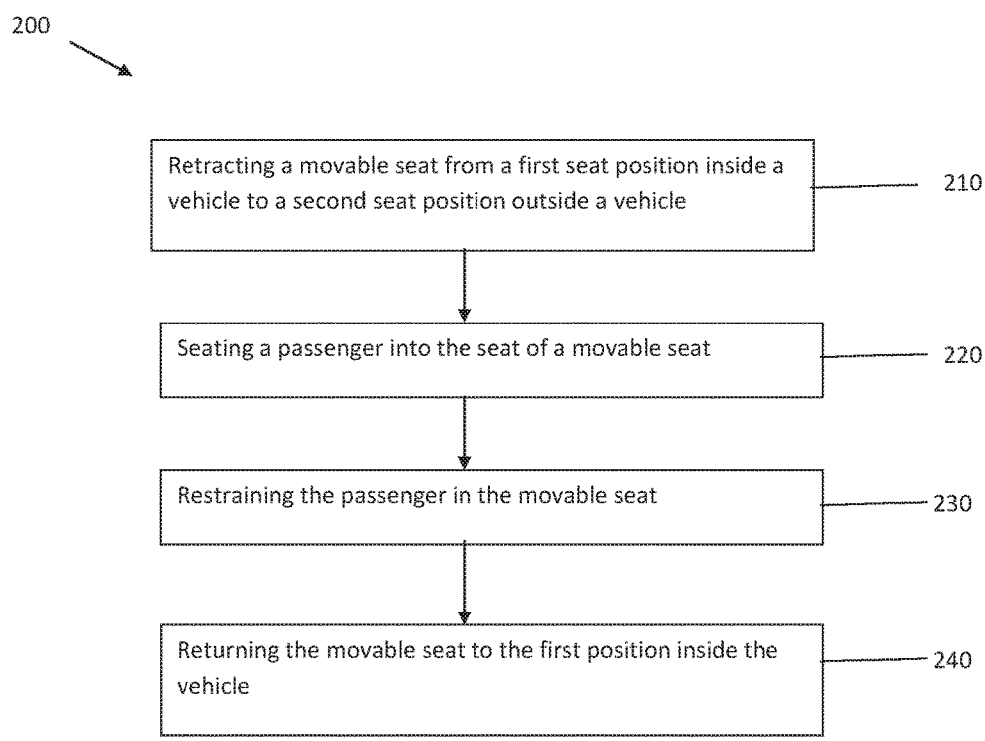
FIG. 10 is a flowchart diagramming steps of a method of using a movable seat.

FIG. 10 is a schematic diagram illustrating steps of a method of use 200. Method of use 200 is a method for securing an uncooperative passenger in a vehicle, comprising a retracting step 210, a seating step 220, a restraining step 230, a returning step 240, and a positioning step 250. In some embodiments of method 200, the vehicle is a government vehicle, such as a police car, police or military van or bus, and the like.

Retracting step 210 comprises retracting a vehicle seat from a first seat position inside a vehicle to a second seat position outside a vehicle. In some embodiments, step 210 is initiated by opening a vehicle side-door or a vehicle rear-door to allow passage of the vehicle seat from inside to outside the vehicle. Once the vehicle door has been opened an adequate distance for vehicle seat to traverse the opening with sufficient clearance, the seat and an associated mechanism is moved through the door opening to the second seat position outside the vehicle. In some embodiments, the associated mechanism is a track system. In some embodiments, the seat is moved manually, by physically grasping the seat, the track system, and/or a handle coupled to either structure and pulling the seat and any coupled structure out of the vehicle door. In alternate embodiments, the seat is moved from a position inside the vehicle to a position outside the vehicle by pressing a button, flipping a switch, using a remote or otherwise initiating an actuator.

In some embodiments, retracting step 210 is completed by locking the seat and/or track mechanism in a fixed position using a locking means.

Seating step 220 comprises seating a passenger into the seat of a vehicle seat. In many embodiments, the passenger will be partially restrained through the use of handcuffs, manacles, zip ties, leather or soft restraints, or similar devices used by members of law enforcement, members of the armed services, certain behavioral health workers, and the like. It is anticipated that many passengers will be uncooperative and/or hostile. Accordingly it is useful, in some embodiments of the vehicle seat comprising a locking mechanism, to lock the seat and/or track system in a fixed position—the second seat position—outside the vehicle. In some embodiments, the seat will further comprise one or any combination of additional elements, such as a step, an opening, a seat back, and a cutout. The seat may also be rotatable in order to allow easier access when placing the passenger into the seat.

In some embodiments, seating step 220 may also include positioning a pair of handcuffed hands of the passenger into an opening of a seat back designed for the purpose of receiving a pair of handcuffed hands. In other embodiments, seating step 220 may include positioning feet of the passenger on a step coupled to the seat.

Restraining step 230 comprises restraining the passenger in the vehicle seat. As mentioned herein above, many passengers will be uncooperative and hostile, and, therefore, potentially dangerous to themselves and other persons within the vehicle. Accordingly, restraining step 230 provides for securely restraining the passenger. In some embodiments, restraining step 230 comprises one or more persons physically holding the passenger in the seat while a separate person secures elements of a passenger restraint system around the passenger. This may involve passing a four-point harness over the shoulders and hips of the passenger and latching the four-point harness at each separate point. Other body restraint devices may similarly by used, such as a five-point harness, a three-point harness, or a two-point harness, for example.

Returning step 240 comprises returning the vehicle seat to the first position inside the vehicle. Similar to retracting step 210, returning step 240 may be performed manually by hand, or automatically with use of a linear actuator, with or without a control. In most embodiments, method 200 concludes with closing the passenger side-door or a rear door of the vehicle. In some embodiments, method 200 additionally comprises locking a seat or a track mechanism in a second seat position within the vehicle, such that the vehicle seat device, in which the passenger is seated and restrained, does not shift during vehicle operation.

In some embodiments, the method further comprises positioning step. Positioning step comprises positioning a face guard or mask in front of a face of the passenger. Many passengers for whom a vehicle seat is designed will be detainees or prisoners in government custody, behavioral health patients, and the like, as mentioned herein above. Some such persons attempt to assault transport personnel and other occupants of a transport vehicle by spitting on such occupants. Accordingly, in some embodiments, a face guard coupled to a vehicle seat, such as with a pivoting or swiveling coupling means, is placed in front of the passenger's face, effectively placing a physical barrier between the passenger and occupants in the front seat of the vehicle. In some embodiments, a positioning step additionally comprises placing a cover, which may or may not be a disposable cover, over the face guard, such that the cover may be cleaned, washed, or replaced between passengers or then a passenger soils the cover by spitting or similar unhygienic passenger activity.

Figure 11:
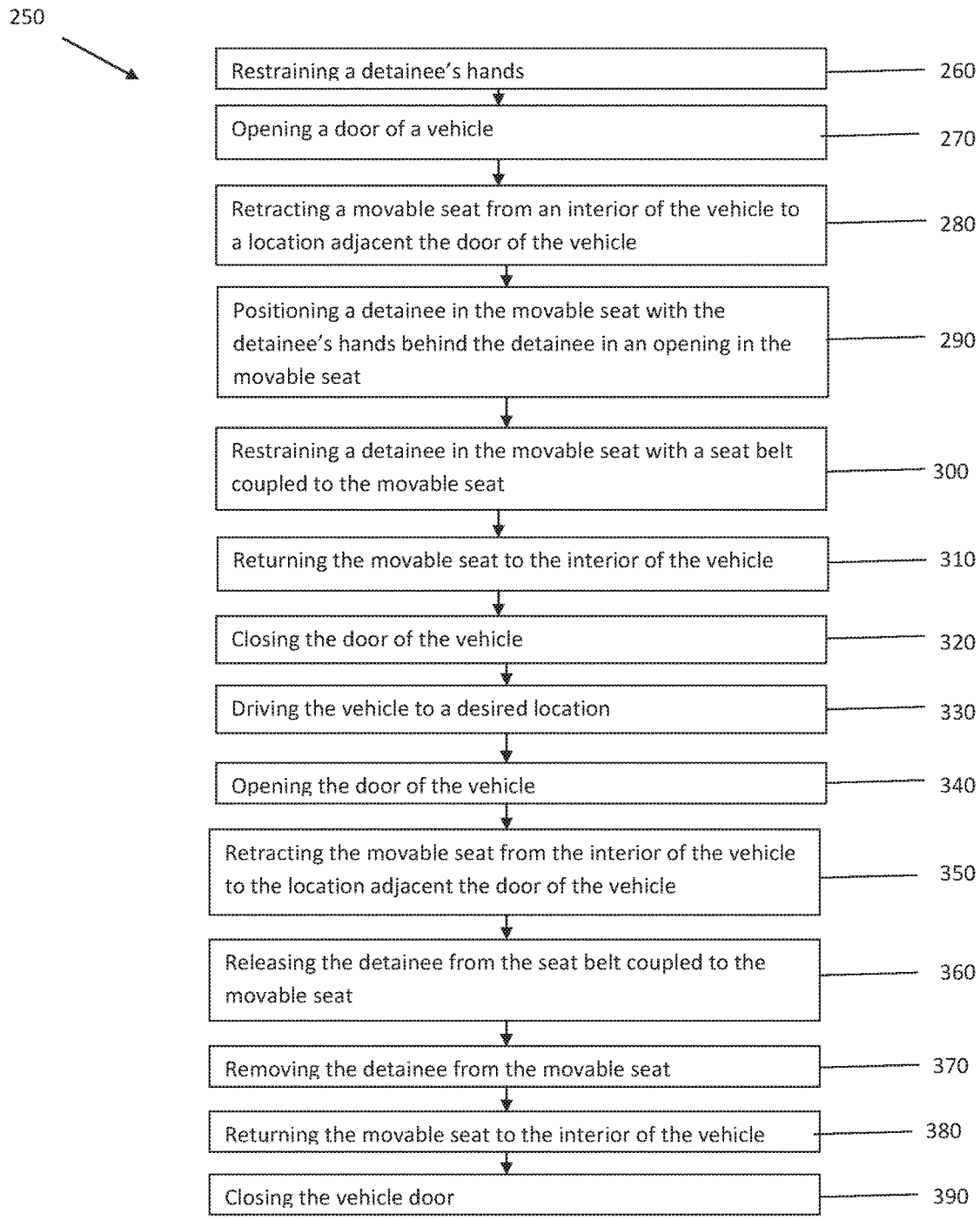
FIG. 11 is a flowchart diagramming steps of an alternate method of using a movable seat.

FIG. 11 illustrates an alternate embodiment of a method of transporting a detainee in a vehicle 250. This method includes restraining a detainee's hands 260. Typically, a detainee's hands will be restrained when arrested or when being moved from their cell or other holding location. Restraining the detainee's hands helps to prevent the detainee from injuring himself or herself, or from injuring those transporting the detainee or bystanders. Additionally, restraining the detainee's hands prevents the detainee from grabbing keys or other weapons with which they could free themselves.

The next step in this method 250 is to open the vehicle door 270. The vehicle door must be opened in order to access the movable seat.

After the vehicle door is open 270, the movable seat is retracted from the interior of the vehicle to a location adjacent the door of the vehicle 280. The movable seat may be moved to a location outside of the vehicle, partially outside of the vehicle or inside the vehicle, but adjacent the door. The movable seat may also rotate and/or tilt to allow easier access to the seat.

Once the movable seat is adjacent the door, the detainee may be positioned in the movable seat 290. The detainee is positioned with his or her restrained hands behind his or her back. The detainee's hands may be placed in an opening in the back of the movable seat. This opening may be an indentation in the back of the movable seat which allows the detainee to comfortably sit with their hands behind their back. This opening may also be a hole that passes the entire way through the back of the movable seat. The detainee's hands are then placed through the hole in the back of the seat with the detainee's hands then being located in a position behind the back of the movable seat.

As it is likely that the detainee will be unwilling to get in the movable seat and stay in the movable seat, law enforcement personnel may be required to hold the detainee in the seat as they restrain the detainee by buckling the detainee into the movable seat with the seat belt that is attached to the seat 300.

The movable seat is then returned to the location inside the vehicle 310. This may be done manually by pushing the movable seat into the vehicle or it may be done automatically by triggering an actuator with a button or the like.

Once the movable seat is back inside the vehicle 310, the door to the vehicle is closed 320.

Then the vehicle can be driven to whatever location the detainee is being transported to 330.

After the vehicle has reached its destination, the door to the vehicle is once again opened 340. Then the movable seat is retracted once again from the interior of the vehicle to a location adjacent the door of the vehicle 350.

The detainee may now be released from the seat belts restraining the detainee in the seat 360. The detainee is removed from the movable seat 370.

Once the detainee is no longer in the movable seat, the seat may be returned to the interior of the vehicle 380. The seat may also be left in a position adjacent the door in order to receive other detainees.

The door to the vehicle may now be closed 390 and the transportation of the detainee is complete.

This invention overcomes the aforementioned and other difficulties encountered with using prior art, like the need of a safe and convenient means to place a handcuffed passenger-detainee in a vehicle for transport while militating or removing opportunities for the passenger to assault law enforcement or other transport personnel and other occupants of the transport vehicle. The vehicle seat additionally allows for safety of the passenger-detainee during transport by securely restraining the passenger using an enhanced passenger restraint system, and by protecting the passenger's handcuffed hands and shoulders from injury arising from forced, involuntary placement and restraint of the passenger in the vehicle seat.

Exceptional results can be obtained with the vehicle seat for a law enforcement vehicle, including use of the several additional features, such as the body restraint, the leg restraint and the opening for receiving a pair of handcuffed hands described herein above. Law enforcement personnel are afforded additional protection from assault by a hostile passenger/detainee. The passenger is provided additional protection from injury during transport. Placement and restraint of an uncooperative passenger is facilitated by transposition of the vehicle seat between a transport position inside the vehicle and a loading position outside the vehicle.

The vehicle seat for a law enforcement vehicle, therefore, is an improvement over the prior art of passenger-detainee/prisoner transport.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A method of restraining a detainee within a vehicle comprising the steps of:
   opening a door on a vehicle comprising a movable seat;
   retracting said movable seat from a first position in said vehicle to a second position adjacent said door of said vehicle;
   seating a detainee in said movable seat of said vehicle, wherein said detainee's hands are restrained behind the detainee's back;
   positioning said detainee's hands in an opening in a back of said movable seat;
   restraining said detainee in said movable seat with a seat belt coupled to said movable seat;
   returning said movable seat to said first position inside said vehicle; and
   closing said door on said vehicle.

2. The method of claim 1, wherein said vehicle is a law enforcement vehicle.

3. The method of claim 1, further comprising locking said movable seat in said first position in said vehicle.

4. The method of claim 1, further comprising restraining said detainee's legs.

5. The method of claim 1, wherein said detainee's hands pass through said movable seat to a position behind said movable seat.

6. The method of claim 1, wherein restraining said detainee comprises holding said detainee in said movable seat and buckling detainee to said movable seat.

7. The method of claim 1, wherein said detainee is fighting against being restrained in said movable seat.

8. The method of claim 1, wherein said movable seat is retracted to said second position and returned to said first position manually.

9. The method of claim 1, wherein said movable seat is retracted to said second position and returned to said first position mechanically.

10. A method of restraining a detainee in a law enforcement vehicle comprising the steps of:
    opening a rear door of a law enforcement vehicle;
    pressing a button to cause a movable seat to travel from a first position within said law enforcement vehicle to a second position adjacent said rear door of said law enforcement vehicle;
    positioning said detainee in said movable seat with said detainee's hands restrained behind the detaineee;
    placing said detainee's hands through an opening in said movable seat so that said detainee's hands are in a position behind said movable seat;
    holding said detainee in said movable seat;
    restraining said detainee in said movable seat with a seat belt coupled to said movable seat;

pressing a button to cause said movable seat to travel from said second position to said first position within said law enforcement vehicle; and closing said rear door of said law enforcement vehicle.

11. The method of claim 10, further comprising rotating a shield in front of said detainee's face.

12. The method of claim 10, wherein said movable seat is locked in said first position for transporting said detainee.

13. The method of claim 10, wherein at least two law enforcement officers hold said detainee in said movable seat and restrain said detainee in said movable seat.

14. A method of transporting a detainee in a vehicle comprising the steps of:
restraining a detainee's hands;
opening a door of a vehicle;
retracting a movable seat from an interior of said vehicle to a location adjacent said door of said vehicle;
positioning a detainee in said movable seat with said detainee's hands behind said detainee in an opening in said movable seat;
restraining a detainee in said movable seat with a seat belt coupled to said movable seat;
returning said movable seat to said interior of said vehicle;
closing said door of said vehicle;
driving said vehicle to a desired location;
opening said door of said vehicle;
retracting said movable seat from said interior of said vehicle to said location adjacent said door of said vehicle;
releasing said detainee from said seat belt coupled to said movable seat;
removing said detainee from said movable seat;
returning said movable seat to said interior of said vehicle; and
closing said vehicle door.

15. The method of claim 14, further comprising locking said movable seat in said interior of said vehicle for transporting said detainee.

16. The method of claim 15, further comprising unlocking said movable seat in said interior of said vehicle for retracting said movable seat from said interior of said vehicle to said location adjacent said door of said vehicle.

17. The method of claim 14, wherein said detainee's hands are positioned through said opening in said movable seat to a position behind said movable seat.

18. The method of claim 14, wherein said movable seat is retracted from said interior of said vehicle to said location adjacent said door of said vehicle manually.

19. The method of claim 14, further comprising pressing a button to retract said movable seat from said interior of said vehicle to said location adjacent said door of said vehicle.

20. The method of claim 14, wherein said seat belt is a four point harness.

* * * * *